United States Patent
Akavaram et al.

(10) Patent No.: US 12,461,670 B2
(45) Date of Patent: Nov. 4, 2025

(54) ENHANCED POWER MANAGEMENT OF FLASH MEMORY DEVICE

(71) Applicant: QUALCOMM Incorporated, San Diego, CA (US)

(72) Inventors: Santhosh Reddy Akavaram, Hyderabad (IN); Prakhar Srivastava, Lucknow (IN); Chintalapati Bharath Sai Varma, Hyderabad (IN); Sridhar Anumala, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 10 days.

(21) Appl. No.: 18/602,637

(22) Filed: Mar. 12, 2024

(65) Prior Publication Data

US 2025/0291499 A1   Sep. 18, 2025

(51) Int. Cl.
*G06F 3/06* (2006.01)

(52) U.S. Cl.
CPC .......... *G06F 3/0625* (2013.01); *G06F 3/0659* (2013.01); *G06F 3/0679* (2013.01)

(58) Field of Classification Search
CPC ..... G06F 3/0625; G06F 3/0659; G06F 3/0679
See application file for complete search history.

(56) References Cited

U.S. PATENT DOCUMENTS

| | | | |
|---|---|---|---|
| 5,361,392 A * | 11/1994 | Fourcroy | G06F 9/30083 710/49 |
| 11,132,050 B2 * | 9/2021 | Zwerg | G06F 3/0656 |
| 2012/0218578 A1 * | 8/2012 | Tanaka | H04N 1/00344 358/1.13 |
| 2013/0097448 A1 * | 4/2013 | Davis | H04L 49/356 710/316 |
| 2017/0133107 A1 * | 5/2017 | Ryan | G06F 3/0605 |
| 2018/0276116 A1 * | 9/2018 | Hahn | G06F 3/0659 |
| 2020/0319895 A1 * | 10/2020 | Vrabel | G06F 1/3296 |

OTHER PUBLICATIONS

Collyer, Geoff. "Setting Interrupt Priorities in Software via Interrupt Queueing." Computing Systems 2.2 (1996): 119-130. (Year: 1996).*
Trüb, Roman. Design and testing of mixed-range low-power wireless networks. Diss. ETH Zurich, 2022. (Year: 2022).*

* cited by examiner

*Primary Examiner* — Nicholas J Simonetti
(74) *Attorney, Agent, or Firm* — Moore IP

(57) ABSTRACT

A device includes a flash interface configured to be coupled to a flash memory device. The device also includes a host controller configured to select an interrupt level that indicates a threshold background operation status of a set of background operation statuses. The host controller is also configured to write the selected interrupt level to a register at the flash memory device to indicate, to the flash memory device, which of the set of background operation statuses are permissible sources of an interrupt from the flash memory device to the host controller.

20 Claims, 7 Drawing Sheets

ENHANCED POWER MANAGEMENT OF FLASH MEMORY DEVICE

I. FIELD

The present disclosure is generally related to improvement in power management associated with a flash memory device.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to operate as a host device that can store and retrieve data from a flash memory device. Flash memory devices, such as Universal Flash Storage (UFS) devices and other NAND flash-based storage memory devices (such as NVM Express (NVMe) solid-state drives (SSDs)), typically include device management functionality for detecting and correcting conditions at the flash memory device that may otherwise impair performance of the flash memory device. For example, conventional flash memory devices can detect that one or more flash management operations such as wear leveling, bad block management, and garbage collection are to be performed. The flash memory device may enter a background operations mode in which time is granted to complete such operations, referred to as "background operations."

In some circumstances, a flash memory device can enter a host power management mode in which the host device controls when the flash memory device performs management operations, enabling the host device to decide when to use and when to conserve system power. For example, if a UFS system including a host device and a flash memory device has very little battery power and the flash memory device has a relatively large amount of unused memory, the host device may elect to not allow the flash memory device to perform clean-up type operations in order to conserve power for more critical system functions. The host power management mode also includes an exception mechanism that may be used by the flash memory device to inform the host device of background operations determined by the flash memory device to be urgent, in addition to other exception events detected at the flash memory device.

However, in cases in which the host device is in a low-power mode to conserve system power, interrupts generated by the flash memory device to inform the host device of exception events cause to host device to transition out of the low-power mode to service the exception events, further draining system power that may already be critically low.

III. SUMMARY

According to one implementation of the present disclosure, a device includes a flash interface configured to be coupled to a flash memory device. The device also includes a host controller configured to select an interrupt level that indicates a threshold background operation status of a set of background operation statuses. The host controller is also configured to write the selected interrupt level to a register at the flash memory device to indicate, to the flash memory device, which of the set of background operation statuses are permissible sources of an interrupt from the flash memory device to the host controller.

According to another implementation of the present disclosure, a method includes selecting, at a host device that is coupled to a flash memory device, an interrupt level that indicates a threshold background operation status of a set of background operation statuses. The method also includes writing the selected interrupt level to a register at the flash memory device to indicate, to the flash memory device, which of the set of background operation statuses are permissible sources of an interrupt from the flash memory device to the host device.

According to another implementation of the present disclosure, a non-transitory computer-readable medium stores instructions that, when executed by one or more processors of a host device coupled to a flash memory device, cause the one or more processors to select an interrupt level that indicates a threshold background operation status of a set of background operation statuses. The instructions further cause the one or more processors to write the selected interrupt level to a register at the flash memory device to indicate, to the flash memory device, which of the set of background operation statuses are permissible sources of an interrupt from the flash memory device to the host device.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
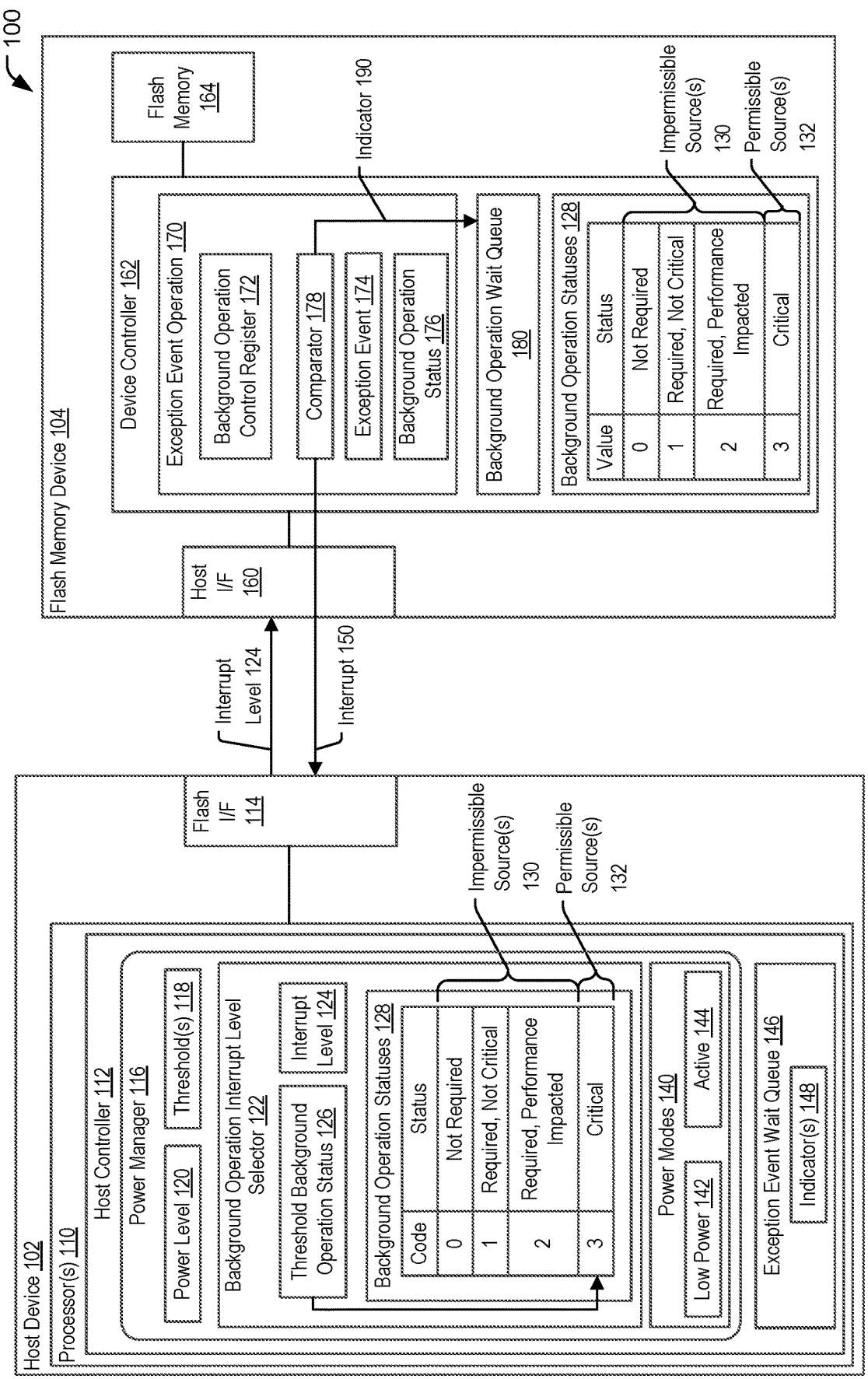
FIG. 1 is a block diagram of a particular illustrative aspect of a system operable to improve power management of a flash memory device, in accordance with some examples of the present disclosure.

Systems and methods of improving power management of a flash memory device are disclosed. Conventionally, a flash memory device operating in a host power management mode can inform the host device of background operations determined by the flash memory device to be urgent, in addition to other exception events detected at the flash memory device. However, in cases in which the host device is in a low-power mode to conserve system power, interrupts generated by the flash memory device to inform the host device of exception events cause to host device to transition out of the low-power mode to service the exception events, further draining system power that may already be critically low.

The systems and techniques described herein provide solutions for improving power management of a system that includes a host device and a flash memory device. According to an aspect, the host device writes an interrupt level to a register of the flash memory device. The interrupt level indicates a threshold status of a background operation that is a permissible source of interrupts from the flash memory device to the host device. When the flash memory device detects an exception event associated with background operations while operating in a host power management mode, the flash memory device can compare a background operation status to the interrupt level and determine whether to send an interrupt to the host device to notify the host device of the exception event, or whether to instead add an indication of the background operations exception event to a wait queue at the flash memory device without sending an interrupt to the host device.

According to an aspect, the host device can set the interrupt level based on a power condition to more effectively manage system power. For example, setting a relatively high interrupt level results in postponing servicing of lower-priority background operations at flash memory device while enabling higher-priority background operations to be serviced. Selectively postponing lower-priority background operations enables the host device to reduce or minimize power consumption associated with performing non-critical background operations at the flash memory device during low-power conditions. In addition, because the flash memory device adds lower-priority background operations to a wait queue without sending an interrupt to notify the host device, the host device avoids having to transition from a low-power mode to an active mode to handle the interrupt, which further reduces unnecessary power consumption and conserves system power.

According to an aspect, the host device can also selectively postpone servicing of non-background operation exception events. To illustrate, the host device may determine that one or more types of exception events are to be postponed during low-power conditions, such as exception events that typically require relatively large amounts of system power to service. The host device adds indicators of postponed exception events to an exception event wait queue to be serviced when adequate system power is available. The ability to postpone exception events enables the host device to more effectively manage system power, and in particular to minimize power consumption for non-critical operations at the flash memory device during low-power conditions.

According to an aspect, device performance and power conservation are also improved by selectively suspending background operations based on a background operation termination latency at the flash memory device. For example, when the flash memory device receives a host command while a background operation is ongoing, and the background operation cannot be completed before the background operation termination latency expires, the background operation is suspended to ensure that a data transfer associated with the host command is initiated before the background operation termination latency expires. After completion of the data transfer associated with the host command, the background operation can be resumed. By suspending and later resuming the background operation, device performance is enhanced and overall power consumption reduced as compared to conventional systems that simply terminate the background operation.

The disclosed techniques provide mechanisms for reducing power consumption and enable a host device to adjust a balance between the competing interests of ensuring the proper performance of the flash memory device while also minimizing power consumption during periods of low system power. For example, the host device may prioritize performance of the flash memory device during periods of adequate system power, and upon detecting that system power has fallen to a low-power condition, the host device may adjust operation to instead prioritize minimizing power consumption, such as by setting the interrupt level to a value that prevents the flash memory device from waking the host device from a low-power mode for non-critical background operations, postponing servicing of one or more exception events, etc. As a result, power management of the system including the flash memory device can be enhanced. By managing power effectively, overall performance can be improved.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a host device 102 including one or more processors ("processor(s)" 110 of FIG. 1), which indicates that in some implementations the host device 102 includes a single processor 110 and in other implementations the host device 102 includes multiple processors 110. For ease of reference herein, such features are generally introduced as "one or more" features and are subsequently referred to in the singular or optional plural (as indicated by "(s)") unless aspects related to multiple of the features are being described.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "obtaining," "generating," "calculating," "estimating," "using," "selecting," "accessing," and "determining" may be used interchangeably. For example, "obtaining," "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect is shown of a system 100 that is configured to improve power management of a flash memory device. The system 100 includes a host device 102 coupled to a flash memory device 104.

The flash memory device 104 includes a device controller 162, a host interface (I/F) 160, and a flash memory 164 (e.g., a multi-die NAND memory). The device controller 162 is responsive to commands received from the host device 102 and is configured to manage memory access operations (e.g., reads and writes) in addition to flash management operations (e.g., background operations such as wear leveling, bad block management, garbage collection, etc.) at the flash memory 164.

According to an aspect, the flash memory device 104 is configurable to operate in a host power management mode, such as in response to a command from the host device 102. When the flash memory device 104 operates in the host power management mode, the device controller 162 postpones performing background operations until instructed to do so by host device 102. However, when the device controller 162 detects that one or more urgent or critical operations should be performed, the device controller 162 is configured to perform an exception event operation 170 to notify the host device 102.

To illustrate, the device controller 162 is configured to perform an exception event operation 170 in response to detection of an exception event 174, which may correspond to a background operation exception event or a non-background operation exception event. When the exception event 174 corresponds to a non-background operation exception event, the exception event operation 170 includes sending an interrupt 150 to the host device 102 indicating the exception event 174. For example, in a UFS implementation, non-background operation exception events can include: dynamic capacity, indicating a request that the host device 102 release blocks of the flash memory 164 to be repurposed as spare blocks; system pool exhausted, indicating that a storage area of the flash memory 164 dedicated for storing system data of the host device 102 is full; temperature too high; temperature too low; performance throttling, indicating that the flash memory device 104 is operating at reduced performance; or write booster flush needed, indicating that a write booster buffer in the flash memory device 104 needs to be flushed.

When the exception event 174 corresponds to a background operation exception event, an interrupt 150 is not automatically sent in response to detection of the exception event 174. Instead, the exception event operation 170 includes comparing a background operation status 176 to an interrupt level 124 that is stored in a background operation control register 172. Based on the comparison, the device controller 162 either sends an interrupt 150 to the host controller 112 or adds an indicator 190 of the background operation exception event 174 to a background operation wait queue 180 at the flash memory device 104. In a particular example, the background operation wait queue 180 is dedicated for pending background operations.

The background operation status 176 can correspond to an attribute (e.g., "bBackgroundOpsStatus") of the flash memory device 104 and can be one of a set of background operation statuses 128. Each of the background operation statuses 128 can be associated with a corresponding value (e.g., a numerical or bit identifier) indicating that particular status. As illustrated, the set of background operation statuses 128 includes: a status of "not required" corresponding to a value of 0 (e.g., 00 h, where 'h' indicates a hexadecimal value); a status of "required, not critical" corresponding to a value of 1 (e.g., 01 h); a status of "required, performance impacted" corresponding to a value of 2 (e.g., 02 h); and a status of "critical" corresponding to a value of 3 (e.g., 03 h).

The device controller 162 may be configured by default to identify a background operation status 176 of "critical" or "required, performance impacted" as exception events that trigger sending an interrupt 150 indicating an urgent background operations exception status. According to an aspect, upon entering the host power management mode, the background operation control register 172 is enabled and set to an interrupt level 124 by the host device 102. The interrupt level 124 indicates which status or statuses of the set of background operation statuses 128 are permissible source(s) 132 of an interrupt 150, and which status or statuses of the set of background operation statuses 128 are impermissible source(s) 130 of an interrupt 150. In a particular embodiment, the background operation control register 172 can correspond to an 8-bit masking control register (e.g., "bBkOpsCtl").

According to an aspect, the device controller 162 includes a comparator 178 configured to determine whether the background operation status 176 is greater than or equal to the status indicated by the interrupt level 124 in the background operation control register 172, in which case the interrupt 150 is generated, or whether the background operation status 176 is less than the status indicated by the interrupt level 124 in the background operation control register 172, in which case the interrupt 150 is not generated. In the illustrated example, the interrupt level 124 stored in the background operation control register 172 has a value of 3 (corresponding to "critical"), indicating that the background operation status 176 having values of 0, 1, or 2 (corresponding to "not required," "required, not critical," and "required, performance impacted," respectively) are impermissible sources 130 and do not result in generation of the interrupt 150. However, a background operation status 176 having a value of 3 is a permissible source 132 that causes the exception event operation 170 to generate an interrupt 150 indicating urgent background operations to the host device 102.

Thus, the flash memory device 104 is configured to detect a background operation exception event 174 and, based on a comparison of the background operation status 176 to the interrupt level 124 in the background operation control register 172, select whether to send an interrupt 150 to the host controller 112. Based on the comparison indicating that the background operation status 176 is not a permissible source 132 of an interrupt 150, the flash memory device 104 is configured to add an indicator 190 of the background operation exception event 174 to the background operation wait queue 180 without sending an interrupt 150.

The host device 102 includes one or more processors 110 that include a host controller 112 and that are coupled to a flash interface 114. The flash interface 114 is configured to be coupled to the flash memory device 104 and to enable the host controller 112 to communicate with the device controller 162 of the flash memory device 104 via messaging between the flash interface 114 and the host interface 160. According to some embodiments, the host controller 112 is configured to send commands and data to the device controller 162, and to receive responses, data, and interrupts 150 from the device controller 162.

The host controller 112 includes a power manager 116 that is configured to perform one or more operations based on a power level 120. According to an example, the power level 120 corresponds to an indication of an amount of battery power available at the host device 102, such as a value indicating a percentage from 100 (e.g., a battery of the host device 102 is fully charged, the host device 102 is coupled to an external power supply, or both) to 0 (e.g., the battery is fully discharged and the host device 102 is not connected to an external battery supply).

In some embodiments, the power manager 116 is configured to transition between one or more power modes 140, such as from an active mode 144 to a low-power mode 142, based on comparing the power level 120 to one or more thresholds 118. As an example, the one or more thresholds 118 can include a "low-power condition" threshold, and the power manager 116 initiates a process to transition from the active mode 144 to the low-power mode 142 based on the power level 120 satisfying (e.g., having a value less than) than the "low-power condition" threshold. For example, the "low-power condition" threshold can indicate a power level below which the host controller 112 initiates power-saving measures and may be a value in the range of 10% to 20% of battery capacity, such as 15%, as an illustrative, non-limiting example. According to an aspect, transitioning from the active mode 144 to the low-power mode 142 includes transitioning the flash memory device 104 to a host power management mode (if the flash memory device 104 is not already in the host power management mode) and writing the interrupt level 124 into the background operation control register 172 of the device controller 162.

The power manager 116 includes a background operation interrupt level selector 122 that is configured to select a value of the interrupt level 124 that indicates a threshold background operation status 126 of the set of background operation statuses 128. For example, the power manager 116 is configured to select the interrupt level 124 based on a power level 120 of the device. To illustrate, the one or more thresholds 118 can include one or more "background operation interrupt" thresholds associated with one or more of the set of background operation statuses 128, and the background operation interrupt level selector 122 may select the interrupt level 124 based on one or more comparisons of the power level 120 to the "background operation interrupt" thresholds.

According to an embodiment, the one or more thresholds 118 include a first "background operation interrupt threshold" corresponding to the threshold background operation status 126 being the "critical" status. Based on the power level 120 satisfying (e.g., being less than) the first "background operation interrupt" threshold, the background operation interrupt level selector 122 selects the threshold background operation status 126 as the "critical" status and sets the interrupt level 124 to a value (e.g., 03 h) indicating that the "critical" status is a permissible source 132 of interrupts from the flash memory device 104, and that the "not required," "required, non-critical," and "required, performance impacted" statuses are impermissible sources 130 of interrupts from the flash memory device 104. As a result, interrupts 150 for background operations from the flash memory device 104 to the host controller 112 are prevented unless the background operation status 176 corresponds to the "critical" status.

In some embodiments, the one or more thresholds 118 include a second "background operation interrupt" threshold corresponding to the threshold background operation status 126 being the "required, performance impacted" status. Based on the power level 120 satisfying (e.g., being less than) the second "background operation interrupt" threshold and not satisfying (e.g., being greater than or equal to) the first "background operation interrupt" threshold, the background operation interrupt level selector 122 selects the threshold background operation status 126 as the "required, performance impacted" status. The background operation interrupt level selector 122 also sets the interrupt level 124 to a value (e.g., 02 h) indicating that both the "required, not performance impacted" and the "critical" statuses are permissible sources 132 of interrupts from the flash memory device 104, and that the "not required" and the "required, non-critical" statuses are impermissible sources 130 of interrupts from the flash memory device 104. As a result, interrupts 150 for background operations from the flash memory device 104 to the host controller 112 are prevented unless the background operation status 176 corresponds to either of the "required, performance impacted" status or the "critical" status.

In some embodiments, the one or more thresholds 118 include a third "background operation interrupt" threshold corresponding to the threshold background operation status 126 being the "required, not critical" status. Based on the power level 120 satisfying (e.g., being less than) the third "background operation interrupt" threshold and not satisfying (e.g., being greater than or equal to) the second "background operation interrupt" threshold, the background operation interrupt level selector 122 selects the threshold background operation status 126 as the "required, not critical" status. The background operation interrupt level selector 122 also sets the interrupt level 124 to a value (e.g., 01 h) indicating that the "required, not critical," the "required, not performance impacted," and the "critical" statuses are permissible sources 132 of interrupts from the flash memory device 104, and that the "not required" status is an impermissible source 130 of interrupts from the flash memory device 104. As a result, interrupts 150 for background operations from the flash memory device 104 to the host controller 112 are prevented unless the background operation status 176 corresponds to the "required, not critical," the "required, not performance impacted," or the "critical" status.

The host controller 112 is configured to write the selected interrupt level 124 to the background operation control register 172 at the flash memory device 104 to indicate, to the flash memory device 104, which of the set of background operation statuses 128 are permissible source(s) 132 of an interrupt 150 from the flash memory device 104 to the host controller 112. After writing the selected interrupt level 124 to the background operation control register 172 at the flash memory device 104, the host controller 112 is configured to transition to the low-power mode 142.

While in the low-power mode 142, in response to receiving an interrupt 150 from the flash memory device 104, the host controller 112 exits the low-power mode 142 and transitions to the active mode 144 to service the exception event(s) 174 associated with the interrupt 150. In some embodiments, when the interrupt 150 corresponds to an urgent background operation exception event 174, the host controller 112 services the urgent background operation(s) without servicing any background operations that are in the background operation wait queue 180 and then returns to the low-power mode 142. An example of the host controller 112 setting the interrupt level 124 and waking from the low-power mode 142 to service urgent background operation(s) is described in further detail with reference to FIG. 2.

In some embodiments, the host controller 112 is configured to reset (e.g., adjust) the interrupt level 124 based on a power level change of the host device 102. For example, when the power level 120 falls from a "low" power level to a "critically low" power level (e.g., falling from above the first "background operation interrupt" threshold to below the first "background operation interrupt" threshold), the host controller 112 can update the threshold background operation status 126 from the "required, performance impacted" status to the "critical" status and overwrite the value (e.g., 02 h) in the background operation control register 172 with a value (e.g., 03 h) indicating that "required, performance impacted" is no longer a permissible source 132 of an interrupt 150. As another example, when the power level 120 rises from a "critically low" power level to a "low" power level (e.g., rising from below the first "background operation interrupt" threshold to above the first "background operation interrupt" threshold), the host controller 112 can update the threshold background operation status 126 from the "critical" status to the "required, performance impacted" status and overwrite the value (e.g., 03 h) in the background operation control register 172 with a value (e.g., 02 h) indicating that "required, performance impacted" has become a permissible source 132 of an interrupt 150.

In some embodiments, the host controller 112 is configured to service one or more background operations stored at the background operation wait queue 180 of the flash memory device 104 based on a power level change to a power level above a threshold. For example, the one or more thresholds 118 may include a "low-power condition" threshold that indicates a low-power condition. Based on an increase in the power level 120 to a value higher than the "low-power condition" threshold (e.g., due to the host device 102 being connected to an external power supply, or a battery of the host device 102 being recharged above the "low-power condition" threshold), the host controller 112 transitions from the low-power mode 142 to the active mode 144. Upon entering the active mode 144, the host controller 112 can initiate servicing of any or all background operations stored in the background operation wait queue 180, such as in order of urgency of the queued background operations, in order of receipt at the background operation wait queue 180, or a combination thereof. An example of the host controller 112 exiting the low-power mode 142 in response to a power level change is described in further detail with reference to FIG. 3.

In some embodiments, the host controller 112 is configured to receive an interrupt 150 corresponding to one or more exception events 174 and, based on the power level 120 being below a "exception event" threshold, add an indicator 148 of the one or more exception events 174 to an exception event wait queue 146 for later processing. For example, while the host controller 112 is in the low-power mode 142, the device controller 162 may send an interrupt 150 based on one or more exception events 174 that are not due to urgent background operations, such as for dynamic capacity, system pool exhausted, temperature too high, temperature too low, performance throttling, write booster flush needed, or a combination thereof. The host controller 112 may be configured to postpone servicing of one or more such exception events until the power level 120 has risen to an adequate level (e.g., equal to or exceeding an "exception event" threshold of the one or more thresholds 118) and the host controller 112 has transitioned out of the low-power mode 142.

To illustrate, the host controller 112 can receive the interrupt 150 while in the low-power mode 142, transition to the active mode 144 responsive to the interrupt 150, and selectively determine whether to service the exception event 174 before returning to the low-power mode 142, or to instead add an indicator 148 of the exception event 174 into the exception event wait queue 146 and return to the low-power mode 142 without servicing the exception event 174. The determination may be based on how much time and/or power is required to service the various exception types and may further be based on how much power is available at the host device 102 (e.g., via comparison of the power level 120 to a corresponding "exception event" threshold of the one or more thresholds 118). In other examples, the determination may be based on one or more settings of the host controller 112, such as a setting that indicates that exception events corresponding to dynamic capacity and system pool exhausted are to be added to the exception event wait queue 146, and that all other exception events are to be serviced before returning to the low-power mode 142. Selectively postponing servicing exception events enables the host controller 112 to more effectively manage system power, and in particular to reduce or minimize power consumption for non-critical operations at the flash memory device 104 during low-power conditions. An example depicting selectively postponing servicing exception events at the host controller 112 is described in further detail with reference to FIG. 4.

In some embodiments, additional power savings and improved device performance associated with background operations is obtained by selectively suspending ongoing background operations based on a background operation termination latency at the flash memory device 104. For example, the flash memory device 104 can be configured to receive a host command while performing a background operation, suspend the background operation and service the host command based on a determination that a background operation termination latency will expire prior to completion of background operation, and resume the background operation after the host command has been serviced. Suspending and later resuming the background operation results in reduced power consumption and improved device performance as compared to the conventional technique of terminating the background operation when the termination operation cannot be completed prior to expiration of the background operation termination latency. An example of suspending the background operation to service a host command is described in further detail with reference to FIG. 5.

Thus, the system 100 includes various mechanisms that enable the host controller 112 to more effectively manage system power. For example, selectively postponing servicing lower-priority background operations enables the host controller 112 to reduce or minimize power consumption associated with performing non-critical background operations at the flash memory device 104 during low-power conditions. Further, because writing the interrupt level 124 to the background operation control register 172 causes the device controller 162 to not send the interrupt 150 for lower-priority background operations, the host controller 112 avoids having to transition from the low-power mode 142 to the active mode 144 to handle the interrupt 150, which further reduces unnecessary power consumption and conserves system power. Additionally, for non-background operation exception events, selectively postponing servicing of one or more types of exception events and adding the indicators 148 of such exception events to the exception event wait queue 146 enables the host controller 112 to more effectively manage system power, and in particular to minimize power consumption for non-critical operations at the flash memory device 104 during low-power conditions. Device performance and power conservation is also improved by selectively suspending background operations based on a background operation termination latency at the flash memory device 104.

Although these mechanisms—writing the interrupt level 124 to the background operation control register 172 to cause the device controller 162 to not send the interrupt 150 for lower-priority background operations, selectively postponing servicing of one or more types of non-background operation exception events and adding the indicators 148 of such exception events to the exception event wait queue 146, and selectively suspending background operations based on a background operation termination latency at the flash memory device 104—are described as interoperative elements of the system 100 that together provide enhanced power management benefits, the combination of all of these mechanisms in a single system is not necessary to achieve beneficial advantages. Thus, in some embodiments, any one or any two of these mechanisms may be omitted, and the resulting system provides enhanced power management benefits as described above for the remaining mechanisms.

It should be understood that the particular order of operations in the above example(s), or in other examples described herein, is provided for purposes of illustration and not of limitation. In other examples, two or more operations can be performed in another order.

Although various examples are described herein based on a UFS implementation, the disclosed techniques are not limited to UFS implementations and are applicable to a variety of storage technologies. To illustrate, although the set of background operation statuses 128 is depicted as including four statuses that correspond to UFS background operations statuses, in other examples the set of background operation statuses 128 may include any number of statuses (e.g., two, three, five, etc.), different status descriptors and/or different codes than depicted, or a combination thereof. Although a particular example of the exception events 174 is described (e.g., urgent background operations, dynamic capacity, system pool exhausted, temperature too high, temperature too low, performance throttling, and write booster flush needed), in other examples one or more of the exception events 174 may be omitted, one or more other exception events 174 may be added, or any combination thereof.

Although the power modes 140 are described as including the low-power mode 142 and the active mode 144, in other examples the host controller 112 can include more than two power modes 140, such as various low-power modes (e.g., a power-saving mode and a sleep mode), various active modes, transitional modes between two or more other power modes, or any combination thereof.

Figure 2:
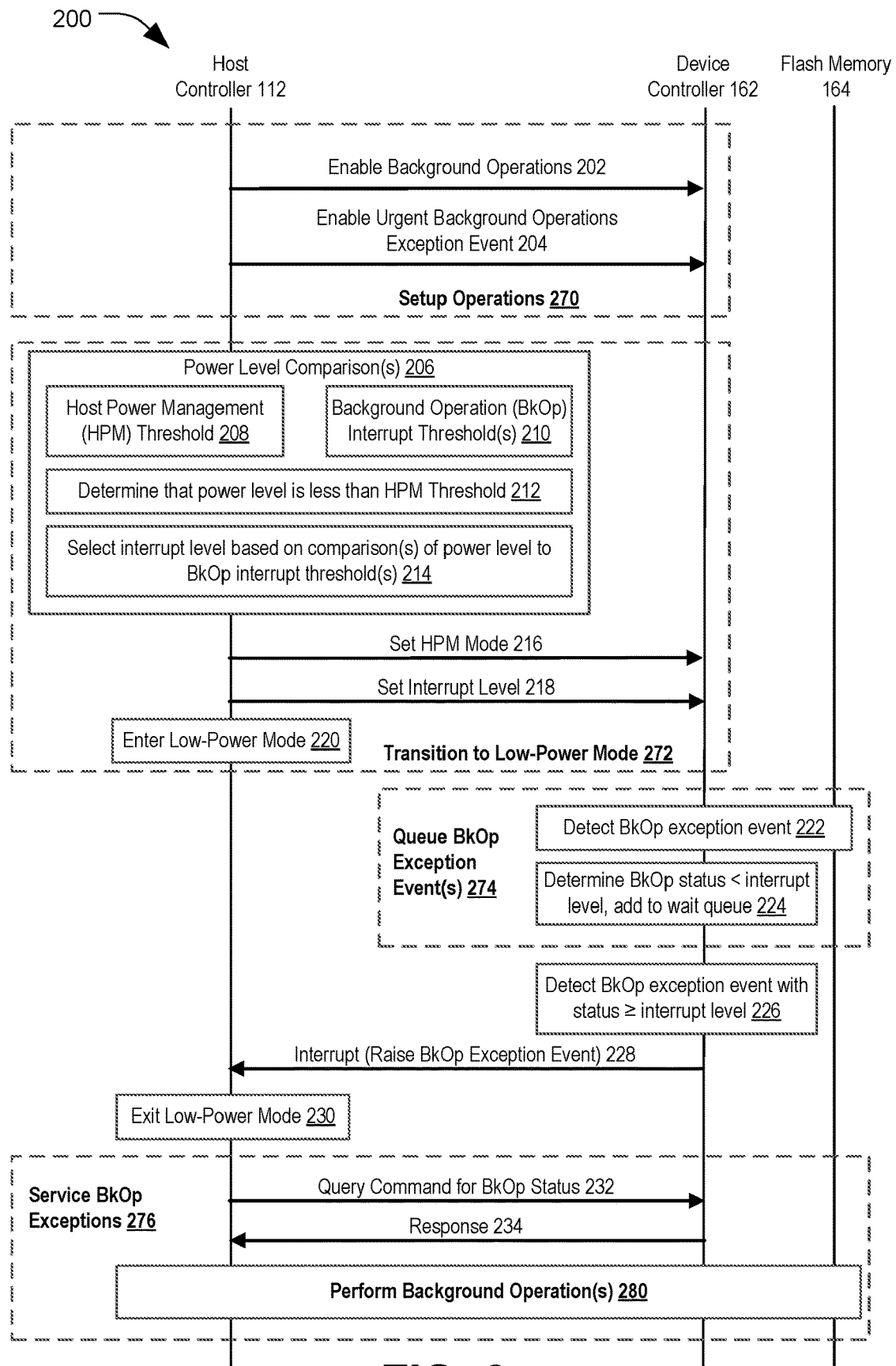
FIG. 2 is a ladder diagram of an illustrative aspect of operations to improve power management of a flash memory device, in accordance with some examples of the present disclosure.

FIG. 2 is a ladder diagram of an illustrative aspect of operations 200 to improve power management of a flash memory device, in accordance with some examples of the present disclosure. In a particular aspect, one or more of the operations 200 are performed by the host controller 112, the host device 102, the device controller 162, the flash memory 164, the flash memory device 104, the system 100 of FIG. 1, or a combination thereof.

The operations 200 include setup operations 270 in which the host controller 112 sends an enable background operations command 202 to the device controller 162, such as by setting a "fBackgroundOpsEn" flag to a value of 1 at the device controller 162. The host controller 112 also sends an enable urgent background operations exception event command 204, such as by setting an "URGENT_BKOPS" bit of a "wExceptionEventControl" attribute to a value of 1b (where b indicates a binary value), wExceptionEventControl.URGENT_BKOPS=1b, at the device controller 162.

The operations 200 include transition to low-power mode operations 272 that include the host controller 112 performing one or more power level comparisons 206. The power level comparison(s) 206 include comparing the power level 120 to a host power management ("HPM") threshold 208 (e.g., one of the thresholds 118, such as the "low-power condition" threshold described above, indicating a power level (e.g., 15%) below which the host controller 112 initiates power-saving measures) and determining that the power level 120 is less than the host power management threshold 208, at operation 212. The power level comparison(s) 206 also include comparing the power level 120 to one or more background operation (BkOp) interrupt thresholds 210 (e.g., the first, second, and/or third "background operation interrupt" thresholds of the threshold(s) 118) and selecting the interrupt level 124 based on the comparisons, at operation 214.

The transition to low-power mode operations 272 also include the host controller 112 sending a set host power management mode command 216 to the device controller 162 to cause the device controller 162 to enter the host power management mode, and the host controller 112 sending a set interrupt level command 218, such as by writing the interrupt level 124 (e.g., 03 h corresponding to "critical" status) to the background operation control register 172, bBkOpsCtl=3 h, at the device controller 162. After setting the device controller 162 to the host power management mode and setting the interrupt level at the device controller 162, the host controller 112 enters a low-power mode, at operation 220. For example, the host controller 112 transitions to the low-power mode 142 after writing the selected interrupt level 124 to the background operation control register 172 at the flash memory device 104.

While the host controller 112 is in the low-power mode, the flash memory device 104 is configured to detect a background operation exception event 174 and, based on a comparison of a background operation status 176 to the interrupt level 124 in the background operation control register 172, select whether to send an interrupt 150 to the host controller 112. To illustrate, one or more queue background operation exception events operations 274 are performed at the device controller 162. For example, a background operation exception event, such as an urgent background operation exception event 174, is detected at operation 222. The device controller 162 determines the background operation status is less than the interrupt level (e.g., 03 h) and adds the background operation exception event to a wait queue, at operation 224. For example, the device controller 162 performs the exception event operation 170 including comparing the background operation status 176 value (e.g., 02 h) to the interrupt level 124 (e.g., 03 h) in the background operation control register 172 and, based on the background operation status 176 being less than the interrupt level 124 (e.g., the background operation status 176 is not a permissible source 132 of interrupts 150), the device controller 162 adds the indicator 190 to the background operation wait queue 180. The operations 222 and 224 may repeat as other urgent background operation exception events are detected, determined to be associated with a background operation status 176 value (e.g., 02 h) that is less than the interrupt level 124 (e.g., 03 h), and added to the background operation wait queue 180 while the host controller 112 remains in the low-power mode.

The device controller 162 detects a background operation exception event with a status that is greater than or equal to the interrupt level, at operation 226. For example, the device controller 162 performs the exception event operation 170 including comparing the background operation status 176 value (e.g., 03 h) to the interrupt level 124 (e.g., 03 h) in the background operation control register 172. In response to the background operation status 176 value equaling the interrupt level 124, the device controller 162 sends an interrupt 228 (e.g., the interrupt 150) that raises the background operation exception event to the host controller 112. The interrupt 228 wakes the device controller 162, and the device controller 162 exits the low-power mode, at operation 230.

After exiting the low-power mode, a service background operation exceptions operation 276 is performed that includes the device controller 162 sending a query command 232 to the device controller 162 for the background operation status 176 associated with the interrupt 228. In response to the query command 232, the device controller 162 sends a response 234 that includes the background operation status 176. For example, the host controller 112 may send a host request query command to read the bBackgroundOpStatus attribute of the flash memory device 104, and the device controller 162 may send a response UFS Protocol Information Unit (UPIU) that includes the bBackgroundOpStatus attribute (e.g., the background operation status 176 value (e.g., 03 h)).

After receiving the response 234, the host controller 112 initiates performance, at the device controller 162, the flash memory 164, or both, of the background operation(s) associated with the interrupt 228, at operation 280. Upon completion of the background operation(s) associated with the interrupt 228, the host controller 112 may transition back to the low-power mode 142.

By setting the interrupt level 124 to a higher level (e.g., 03 h) than a default level (e.g., 02 h) that the device controller 162 would otherwise use to trigger interrupts to the host controller 112 for urgent background operation exception events, the device controller 162 refrains from waking the host controller 112 for each of the background operation exception events that are added to the background operation wait queue 180 during the one or more queue background operations exception events operations 274. As a result, power consumption associated with the host controller 112 transitioning from the low-power mode 142 to the active mode 144, sending a query to the device controller 162 for the background operation status 176, receiving a response from the device controller 162 with the background operation status 176, and determining whether or not to perform the background operation before transitioning back to the low-power mode 142 is avoided for each of the queue background operation exception events operations 274.

Figure 3:
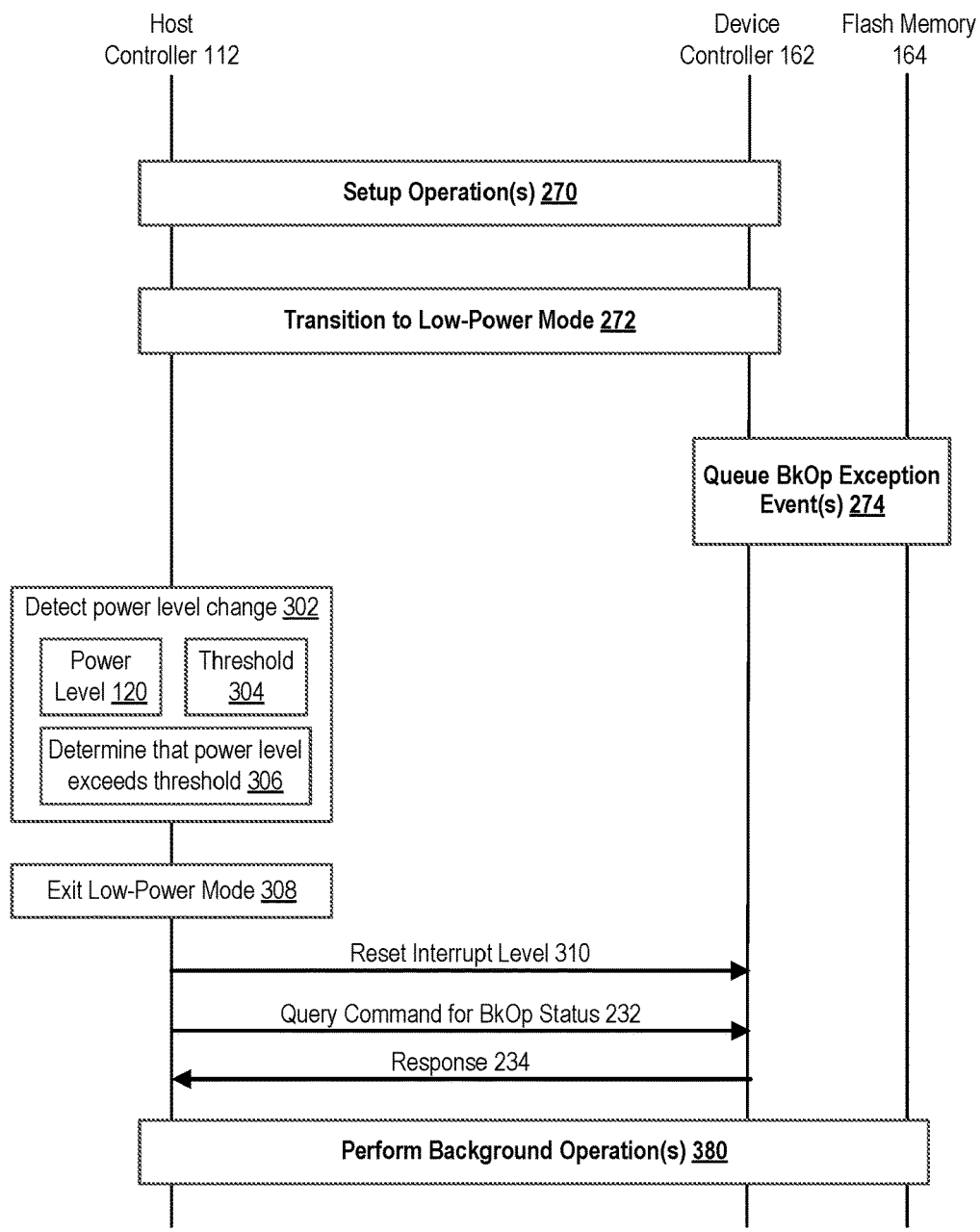
FIG. 3 is a ladder diagram of another illustrative aspect of operations to improve power management of a flash memory device, in accordance with some examples of the present disclosure.

FIG. 3 is a ladder diagram of an illustrative aspect of operations 300 to improve power management of a flash memory device, in accordance with some examples of the present disclosure. In FIG. 3, the host controller 112 transitions from the low-power mode 142 in response to detecting a power level change instead of in response to an interrupt as in FIG. 2. In a particular aspect, one or more of the operations 300 are performed by the host controller 112, the host device 102, the device controller 162, the flash memory 164, the flash memory device 104, the system 100 of FIG. 1, or a combination thereof.

The operations 300 include the setup operations 270 followed by the transition to low-power mode operations 272 of FIG. 2, during which the host controller 112 sets the interrupt level 124 (e.g., 03 h) at the device controller 162 and transitions to the interrupt level 124. While the host controller 112 is in the low-power mode 142, one or more of the queue background operation events operations 274 of FIG. 2 are performed at the device controller 162 for background operation exception events associated with a background operation status 176 (e.g., 02 h) that is less than the interrupt level 124.

The host controller 112 detects a power level change 302 of the host device 102. For example, the host controller 112 may have entered the low-power mode 142 in response to the power level 120 being lower than the host power management threshold 208. While in the low-power mode 142, the power level 120 may increase above a threshold 304 that indicates that the host device 102 has sufficient power for normal operation, such as due to the host device 102 being coupled to an external power source, or due to a battery of the host device 102 being charged to a power level that exceeds the threshold 304. According to an aspect, the threshold 304 corresponds to the host power management threshold 208 or a higher threshold (e.g., a value in the range from 50% to 90%, such as 70%, as an illustrative, non-limiting example). Detecting the power level change 302 includes determining, at operation 306, that the power level 120 exceeds the threshold 304.

In response to detecting the power level change 302, the host controller 112 exits the low-power mode, at operation 308. In some embodiments, the host controller 112 is configured to reset the interrupt level 124 based on the power level change 302, at operation 310. For example, the host controller 112 may overwrite an interrupt level 124 in the background operation control register 172 (e.g., 03 h) with a lower or default interrupt level 124 (e.g., 02 h).

The host controller 112 is also configured to, based on detecting the power level change 302, service one or more background operations stored at the background operation wait queue 180 of the flash memory device 104. For example, the host controller 112 may send the query command 232 to the device controller 162, and receive the response 234 from the device controller 162 as described with reference to FIG. 2. The host controller 112 initiates performance, at the device controller 162, the flash memory 164, or both, of the background operation(s) at the background operation wait queue 180, at operation 380. For example, the host controller 112 may set a mode enable bit at the device controller 162 to enter a background operations mode in which the device controller 162 is permitted to perform background operations that are pending at the background operation wait queue 180.

Figure 4:
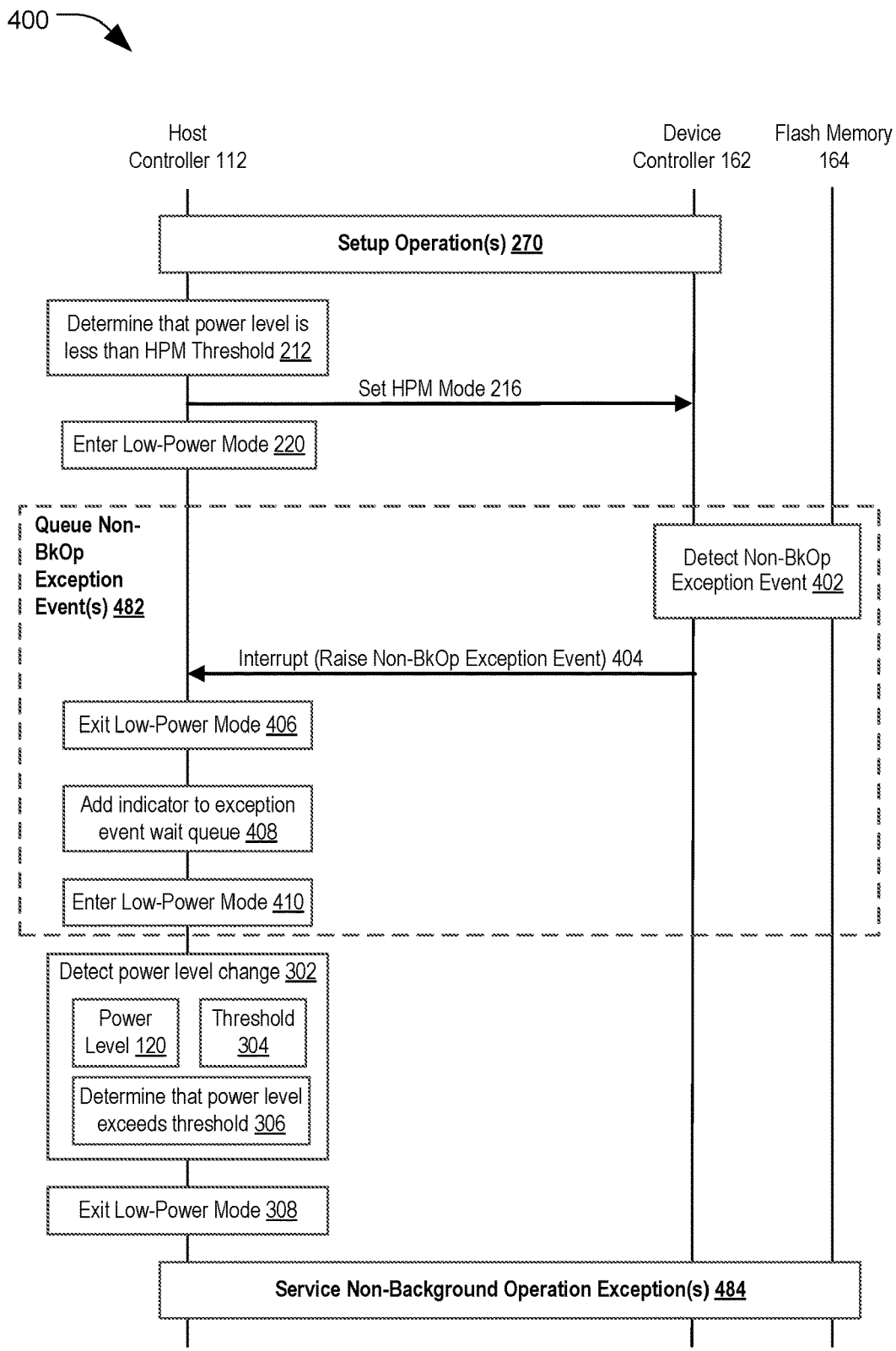
FIG. 4 is a ladder diagram of another illustrative aspect of operations to improve power management of a flash memory device, in accordance with some examples of the present disclosure.

FIG. 4 is a ladder diagram of an illustrative aspect of operations 400 to improve power management of a flash memory device, in accordance with some examples of the present disclosure. In FIG. 4, the host controller 112 queues non-background exception events while in the low-power mode. In a particular aspect, one or more of the operations 400 are performed by the host controller 112, the host device 102, the device controller 162, the flash memory 164, the flash memory device 104, the system 100 of FIG. 1, or a combination thereof.

The operations 400 include the setup operations 270 of FIG. 2, followed by the host controller 112 determining that the power level 120 is less than the host power management threshold 208, at operation 212. The host controller 112 sends the set host power management mode command 216 to the device controller 162 to cause the device controller 162 to enter the host power management mode.

After setting the device controller 162 to the host power management mode, the host controller 112 enters a low-power mode, at operation 220. Optionally, the host controller 112 may also select the interrupt level 124 as in operation 214 and send the set interrupt level command 218 prior to entering the low-power mode.

While the host controller 112 is in the low-power mode, one or more queue non-background operation exception events operations 482 are performed. To illustrate, the device controller 162 detects a non-background operation exception event, at operation 402. For example, the non-background operation exception event can correspond to one of: dynamic capacity, system pool exhausted, temperature too high, temperature too low, performance throttling, or write booster flush needed. The device controller 162 sends an interrupt 404 (e.g., the interrupt 150) to raise the non-background exception event to the host controller 112.

The host controller 112 exits the low-power mode, at operation 406, in response to receiving the interrupt 404. The host controller 112 may determine which exception event triggered the interrupt 404, such as by reading event status bits in an event status attribute (e.g., "wException-EventStatus") in a device information field of a response UPIU from the device controller 162. The host controller 112 adds the exception event to the exception event wait queue 146, at operation 408, and enters the low-power mode, at operation 410. For example, the host controller 112 may compare the exception event to a set of exception events that the host controller 112 is permitted to postpone (which may further be based on the power level 120), and in response to determining that the exception event can be postponed, the host controller 112 adds an indicator 148 of the exception event to the exception event wait queue 146 for later processing and returns to the low-power mode. (Alternatively, if the host controller 112 is not permitted to postpone the exception event, the host controller 112 services the exception event before returning to the low-power mode.) The operations 402-410 may repeat as other non-background operation exception events are detected and either serviced by the host controller 112 or added to the exception event wait queue 146 before the host controller 112 returns to the low-power mode.

The host controller 112 detects a power level change 302 of the host device 102 as described in FIG. 3. For example, while in the low-power mode, the power level 120 may increase above the threshold 304, such as due to the host device 102 being coupled to an external power source, or due to a battery of the host device 102 being charged to a power level that exceeds the threshold 304. According to an aspect, the threshold 304 corresponds to the host power management threshold 208 or a higher threshold (e.g., a value in the range from 50% to 90%, such as 70%, as an illustrative, non-limiting example). In response to detecting the power level change 302, the host controller 112 exits the low-power mode, at operation 308, and initiates service of the non-background operation exceptions that are stored in the exception event wait queue 146, at operation 484.

Selectively postponing servicing exception events enables the host controller 112 to more effectively manage system power by reducing or minimizing power consumption associated with performance of non-critical operations at the flash memory device 104 during a low-power condition.

Figure 5:
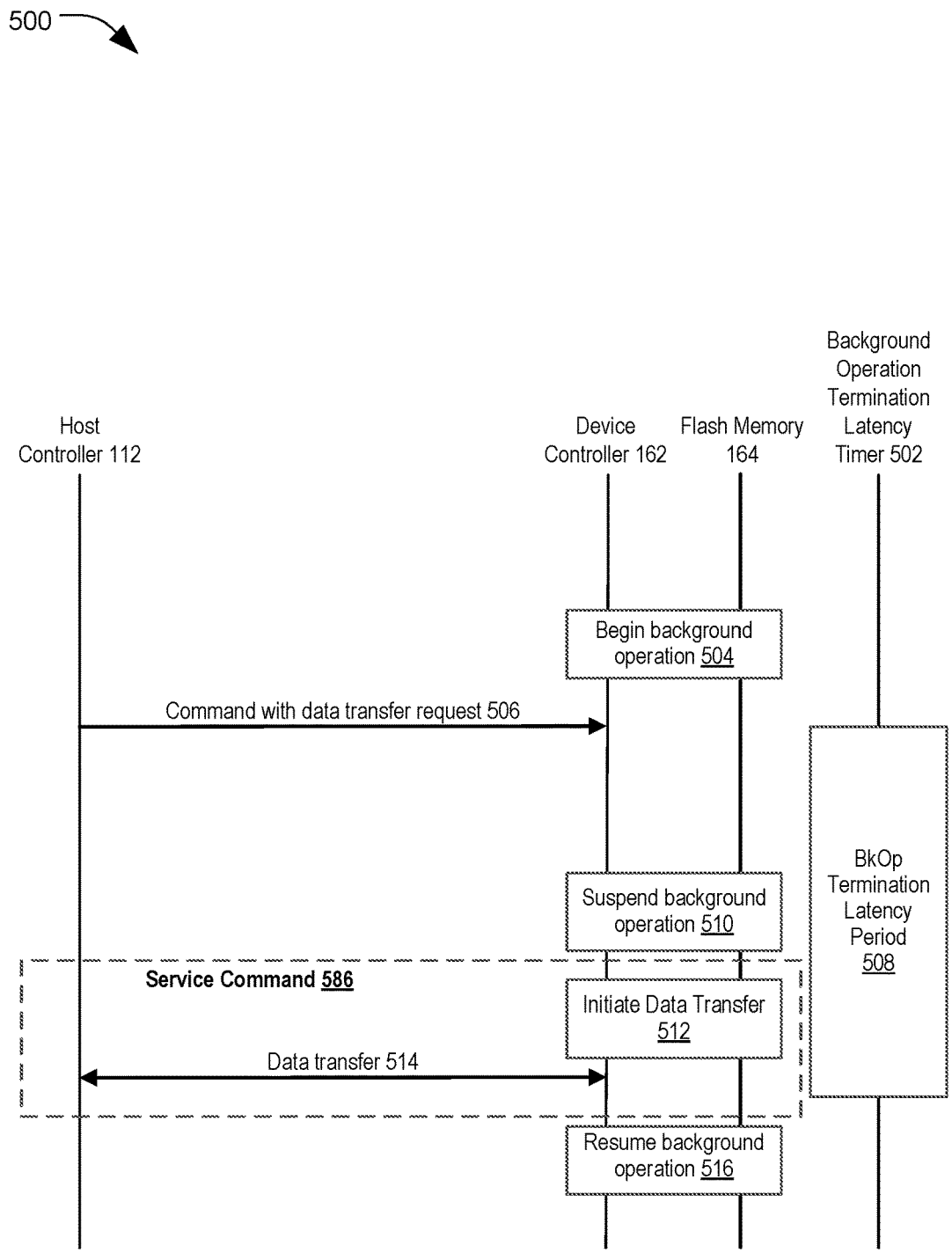
FIG. 5 is a ladder diagram of another illustrative aspect of operations to improve power management of a flash memory device, in accordance with some examples of the present disclosure.

FIG. 5 is a ladder diagram of an illustrative aspect of operations 500 to improve power management of a flash memory device, in accordance with some examples of the present disclosure. In FIG. 5, the device controller 162 is configured to suspend a background operation when the background operation will not be able to be completed before expiration of a background operation termination latency. In a particular aspect, one or more of the operations 500 are performed by the host controller 112, the host device 102, the device controller 162, the flash memory 164, the flash memory device 104, the system 100 of FIG. 1, or a combination thereof.

The operations 500 include the device controller 162 beginning a background operation at the flash memory 164, at operation 504. While performing the background operation, the device controller 162 receives a host command 506 with a data transfer request, such as a request to read data from the flash memory 164 or to write data to the flash memory 164. Receipt of the command 506 causes the device controller 162 to start a background operation termination latency timer 502.

The background operation termination latency timer 502 is configured to run for a time period illustrated as a background operation termination latency period 508. The duration of the background operation termination latency period 508 is indicated by the background operation termination latency parameter of the flash memory device 104, such as a "bBackgroundOpsTermLat" parameter in a device descriptor of the flash memory device 104. The background operation termination latency parameter defines the maximum allowed latency for the termination of ongoing background operations. In an example, when the flash memory device 104 receives a command UPIU with a data transfer request, the flash memory device 104 is required to start the data transfer and send or a Data In UPIU, or a Ready-to- Transfer (RTT) UPIU to the host controller 112 within the latency specified by the background operation termination latency parameter.

Based on the device controller 162 determining that the background operation termination latency period 508 will expire prior to completion of the background operation, the device controller 162 suspends the background operation, at operation 510, and services the command 506, at operation 586. In particular, the device controller 162 initiates the data transfer, at operation 512, and sends a Data In UPIU are a RTT UPIU to the host controller 112 before the expiration of the background operation termination latency period 508, although a data transfer 514 associated with servicing the command 506 may continue beyond the background operation termination latency period 508.

After the servicing of the command 506 is complete, the device controller 162 and/or the flash memory 164 resumes the background operation, at operation 516. In a particular embodiment, when the background operation is suspended, the device controller 162 saves a current state (e.g., progress data, parameter values, counters, etc.) of the background operation. After the command 506 has been serviced, the device controller 162 may reload the saved state and resume the background operation. According to an aspect, the device controller 162 is configured to delay suspending the background operation as long as possible while still ensuring that the data transfer 514 can be initiated before the end of the background operation termination latency period 508 to maximize the progress of the background operation while remaining compliant with the background operation termination latency restriction.

By suspending and later resuming the background operation based on determining that the background operation termination latency period 508 will expire before the background operation can be completed, performance of the flash memory device 104 is improved, and power consumption reduced, as compared to terminating the background operation.

Figure 6:
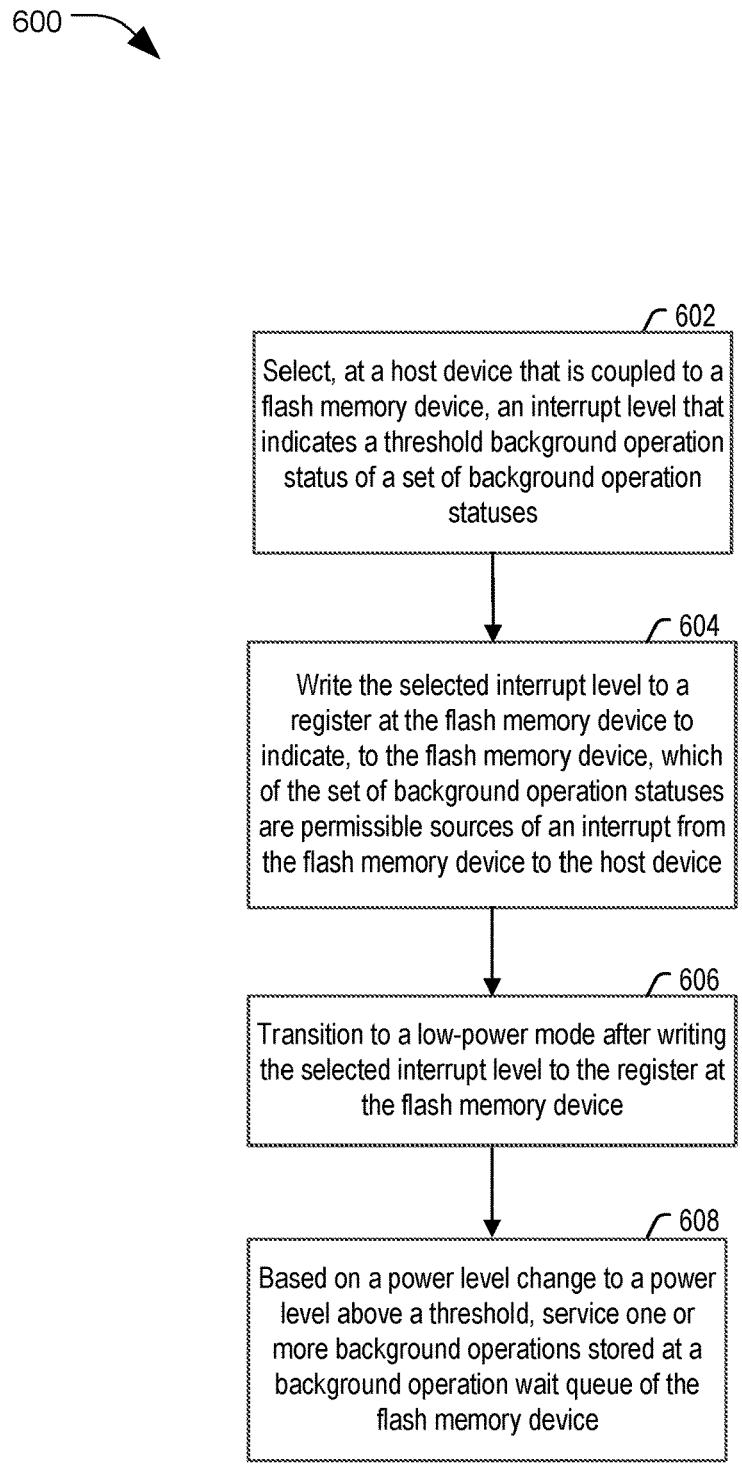
FIG. 6 is a diagram of a particular implementation of a method to improve power management of a flash memory device that may be performed by the host device of FIG. 1, in accordance with some examples of the present disclosure.

FIG. 6 is a diagram of a particular implementation of a method 600 to improve power management of a flash memory device that may be performed by the host device 102 of FIG. 1, in accordance with some examples of the present disclosure. In a particular aspect, one or more of the operations of the method 600 are performed by the host controller 112, the host device 102, the system 100 of FIG. 1, or a combination thereof.

The method 600 includes, at block 602, selecting, at a host device that is coupled to a flash memory device, an interrupt level that indicates a threshold background operation status of a set of background operation statuses. For example, the host controller 112 selects the interrupt level 124 that indicates the threshold background operation status 126 of the set of background operation statuses 128. The interrupt level may be selected based on a power level of the host device. For example, the host controller 112 compares the power level 120 to one or more background operation interrupt thresholds of the one or more thresholds 118. In a particular embodiment, the set of background operation statuses includes: not required; required, not critical; required, performance impacted; and critical.

The method 600 includes, at block 604, writing the selected interrupt level to a register at the flash memory device to indicate, to the flash memory device, which of the set of background operation statuses are permissible sources of an interrupt from the flash memory device to the host device. For example, the host controller 112 writes the interrupt level 124 to the background operation control register 172 to indicate which of the set of background operation statuses 128 are permissible source(s) 132 of an interrupt 150 and which of the set of background operation statuses 128 are impermissible source(s) 130 of an interrupt 150.

The method 600 optionally includes, at block 606, transitioning to a low-power mode after writing the selected interrupt level to the register at the flash memory device. For example, the host controller 112 transitions from the active mode 144 to the low-power mode 142 after writing the interrupt level 124 to the background operation control register 172.

The method 600 optionally includes, at block 608, based on a power level change to a power level above a threshold, servicing one or more background operations stored at a background operation wait queue of the flash memory device. For example, based on detecting the power level change 302 of FIG. 3 to the power level 120 above the threshold 304, the host controller 112 initiates performing the background operations, at operation 380.

In some embodiments, the method 600 includes resetting the interrupt level based on a power level change of the host device. For example, the host controller 112 resets the interrupt level 124 based on the power level change 302, at operation 310 of FIG. 3.

In some embodiments, the method 600 includes receiving an interrupt corresponding to one or more exception events, and based on a power level of the host device being below an exception event power threshold, adding an indicator of the one or more exception events to a wait queue of the host device for later processing. For example, the host controller 112 can receive the interrupt 150 while in the low-power mode 142, transition to the active mode 144 responsive to the interrupt 150, and selectively determine whether to service the exception event 174 before returning to the low-power mode 142, or whether to instead add an indicator 148 of the exception event 174 into the exception event wait queue 146 and return to the low-power mode 142 without servicing the exception event 174. Such determination may be based on how much power is available at the host device 102, such as via comparison of the power level 120 to a corresponding "exception event" threshold of the one or more thresholds 118.

By selectively postponing servicing of lower-priority background operations, the method 600 enables the host device to reduce or minimize power consumption associated with performing non-critical background operations at the flash memory device during low-power conditions. In addition, because writing the interrupt level to the background operation control register causes the flash memory device to not send an interrupt for lower-priority background operations, the host device avoids having to exit a low-power mode and handle the interrupt, which further reduces unnecessary power consumption and conserves system power. As a result, the method 600 provides the technical advantage of improving the power management of the flash memory device.

The method 600 of FIG. 6 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 600 of FIG. 6 may be performed by a processor that executes instructions, such as described with reference to FIG. 7.

Figure 7:
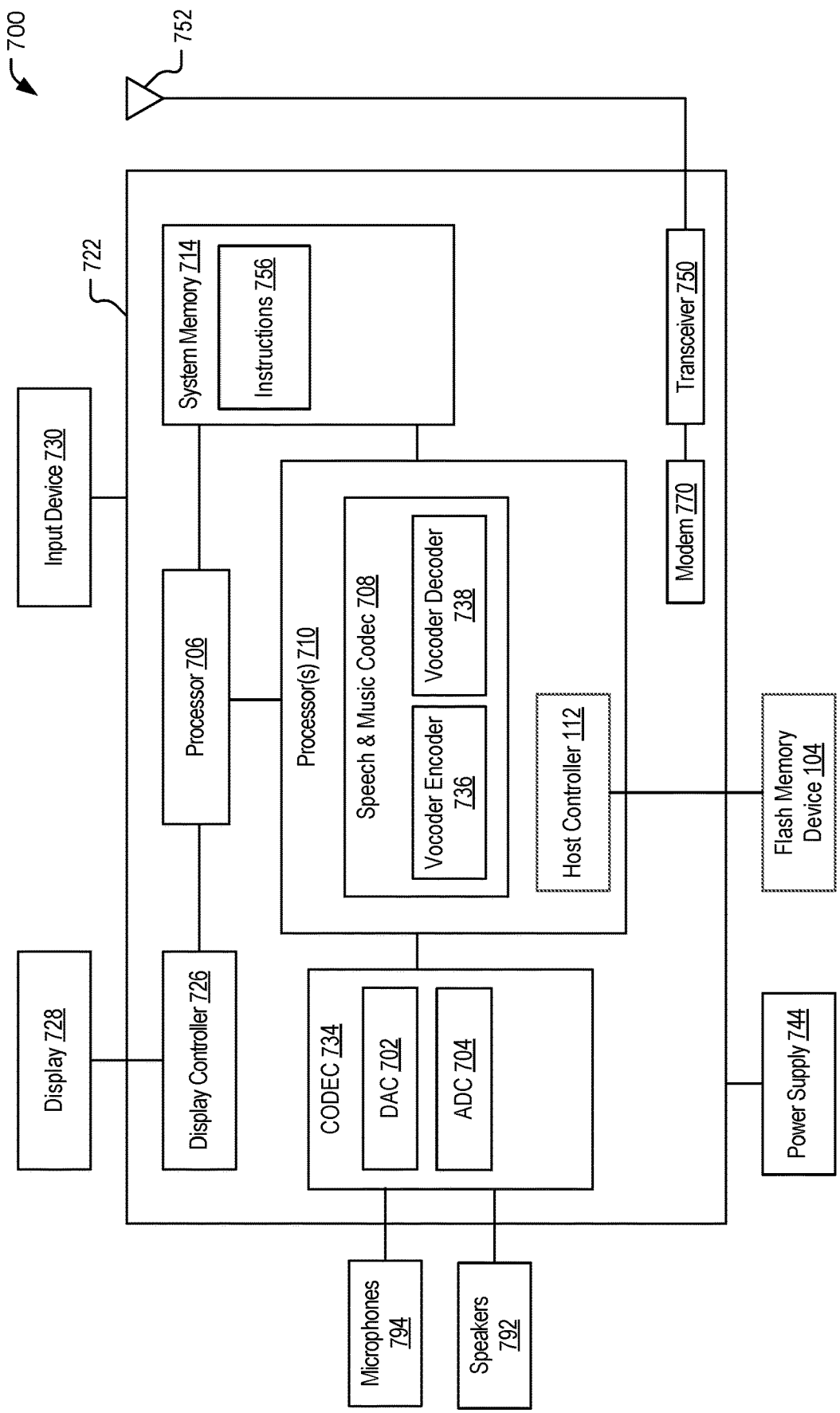
FIG. 7 is a block diagram of a particular illustrative example of a device that is operable to improve power management of a flash memory device, in accordance with some examples of the present disclosure.

Referring to FIG. 7, a block diagram of a particular illustrative implementation of a device is depicted and generally designated 700. In various implementations, the device 700 may have more or fewer components than illustrated in FIG. 7. In an illustrative implementation, the device 700 may correspond to the host device 102. In an illustrative implementation, the device 700 may perform one or more operations described with reference to FIGS. 1-6.

In a particular implementation, the device 700 includes a processor 706 (e.g., a CPU). The device 700 may include one or more additional processors 710 (e.g., one or more DSPs). The processors 710 may include a speech and music coder-decoder (CODEC) 708 that includes a voice coder ("vocoder") encoder 736, a vocoder decoder 738, or both. The processors 710 may include the host controller 112 that is configured to be coupled to the flash memory device 104. Alternatively, the processor 706 and/or the processors 710 may include the device controller 162 that is configured to be coupled to the host device 102.

In this context, the term "processor" refers to an integrated circuit consisting of logic cells, interconnects, input/output blocks, clock management components, memory, and optionally other special purpose hardware components, designed to execute instructions and perform various computational tasks. Examples of processors include, without limitation, central processing units (CPUs), digital signal processors (DSPs), neural processing units (NPU), graphics processing units (GPUs), field programmable gate arrays (FPGAs), microcontrollers, quantum processors, coprocessors, vector processors, other similar circuits, and variants and combinations thereof. In some cases, a processor can be integrated with other components, such as communication components, input/output components, etc. to form a system on a chip (SOC) device or a packaged electronic device.

Taking CPUs as a starting point, a CPU typically includes one or more processor cores, each of which includes a complex, interconnected network of transistors and other circuit components defining logic gates, memory elements, etc. A core is responsible for executing instructions to, for example, perform arithmetic and logical operations. Typically, a CPU includes an Arithmetic Logic Unit (ALU) that handles mathematical operations and a Control Unit that generates signals to coordinate the operation of other CPU components, such as to manage operations of a fetch-decode-execute cycle.

CPUs and/or individual processor cores generally include local memory circuits, such as registers and cache to temporarily store data during operations. Registers include high-speed, small-sized memory units intimately connected to the logic cells of a CPU. Often registers include transistors arranged as groups of flip-flops, which are configured to store binary data. Caches include fast, on-chip memory circuits used to store frequently accessed data. Caches can be implemented, for example, using Static Random-Access Memory (SRAM) circuits.

Operations of a CPU (e.g., arithmetic operations, logic operations, and flow control operations) are directed by software and firmware. At the lowest level, the CPU includes an instruction set architecture (ISA) that specifies how individual operations are performed using hardware resources (e.g., registers, arithmetic units, etc.). Higher level software and firmware is translated into various combinations of ISA operations to cause the CPU to perform specific higher-level operations. For example, an ISA typically specifies how the hardware components of the CPU move and modify data to perform operations such as addition, multiplication, and subtraction, and high-level software is translated into sets of such operations to accomplish larger tasks, such as adding two columns in a spreadsheet. Generally, a CPU operates on various levels of software, including a kernel, an operating system, applications, and so forth, with each higher level of software generally being more abstracted from the ISA and usually more readily understandable by human users.

GPUs, NPUs, DSPs, microcontrollers, coprocessors, FPGAs, ASICS, and vector processors include components similar to those described above for CPUs. The differences among these various types of processors are generally related to the use of specialized interconnection schemes and ISAs to improve a processors ability to perform particular types of operations. For example, the logic gates, local memory circuits, and the interconnects therebetween of a GPU are specifically designed to improve parallel processing, sharing of data between processor cores, and vector operations, and the ISA of the GPU may define operations that take advantage of these structures. As another example, ASICs are highly specialized processors that include similar circuitry arranged and interconnected for a particular task, such as encryption or signal processing. As yet another example, FPGAs are programmable devices that include an array of configurable logic blocks (e.g., interconnect sets of transistors and memory elements) that can be configured (often on the fly) to perform customizable logic functions.

A processor can be configured to perform a specific task by including, within the processor, specialized hardware to perform the task. Additionally, or alternatively, the processor can be configured to perform a specific task by loading and/or executing instructions (e.g., computer code) that, when executed, cause the processor to perform the specific task. Loading executable instructions to perform the task causes an internal configuration change in the processor that transforms what may otherwise be a general-purpose processor into a special purpose processor for performing the task.

The device 700 may include a memory 714 and a CODEC 734. The memory 714 may include instructions 756, that are executable by the one or more additional processors 710 (or the processor 706) to implement the functionality described with reference to the host controller 112. The device 700 may include a modem 770 coupled, via a transceiver 750, to an antenna 752.

The device 700 may include a display 728 coupled to a display controller 726. One or more speakers 792 and one or more microphones 794 may be coupled to the CODEC 734. The CODEC 734 may include a digital-to-analog converter (DAC) 702, an analog-to-digital converter (ADC) 704, or both. In a particular implementation, the CODEC 734 may receive analog signals from the microphone(s) 794, convert the analog signals to digital signals using the analog-to-digital converter 704, and provide the digital signals to the speech and music codec 708. The speech and music codec 708 may process the digital signals. In a particular implementation, the speech and music codec 708 may provide digital signals to the CODEC 734. The CODEC 734 may convert the digital signals to analog signals using the digital-to-analog converter 702 and may provide the analog signals to the speaker(s) 792.

In a particular implementation, the device 700 may be included in a system-in-package or system-on-chip device 722. In a particular implementation, the memory 714, the processor 706, the processors 710, the display controller 726, the CODEC 734, and the modem 770 are included in the system-in-package or system-on-chip device 722. In a particular implementation, an input device 730, a power supply 744, and the flash memory device 104 are coupled to the system-in-package or the system-on-chip device 722. Moreover, in a particular implementation, as illustrated in FIG. 7, the display 728, the input device 730, the speaker(s) 792, the microphone(s) 794, the antenna 752, the flash memory device 104, and the power supply 744 are external to the system-in-package or the system-on-chip device 722. In a particular implementation, each of the display 728, the input device 730, the speaker(s) 792, the microphone(s) 794, the antenna 752, the flash memory device 104, and the power supply 744 may be coupled to a component of the system-in-package or the system-on-chip device 722, such as an interface or a controller. For example, the flash memory device 104 may be coupled to the host controller 112.

The device 700 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for selecting an interrupt level that indicates a threshold background operation status of a set of background operation statuses. For example, the means for selecting an interrupt level that indicates a threshold background operation status of a set of background operation statuses can correspond to background operation interrupt level selector 122, the host controller 112, the processor 110, the host device 102, the system 100 of FIG. 1, the processor 706, the processor 710, one or more other circuits or components configured to select an interrupt level that indicates a threshold background operation status of a set of background operation statuses, or any combination thereof.

The apparatus also includes means for writing the selected interrupt level to a register at a flash memory device to indicate, to the flash memory device, which of the set of background operation statuses are permissible sources of an interrupt from the flash memory device to a host device. For example, the means for writing the selected interrupt level to a register at a flash memory device can correspond to the host controller 112, the processor 110, the flash interface 114, the host device 102, the system 100 of FIG. 1, the processor 706, the processor 710, one or more other circuits or components configured to write the selected interrupt level to a register at a flash memory device to indicate, to the flash memory device, which of the set of background operation statuses are permissible sources of an interrupt from the flash memory device to a host device, or any combination thereof.

In some implementations, a non-transitory computer-readable medium (e.g., a computer-readable storage device, such as the memory 714) includes instructions (e.g., the instructions 756) that, when executed by one or more processors (e.g., the processor 110, the one or more processors 710, or the processor 706) of a host device (e.g., the host device 102) coupled to a flash memory device (e.g., the flash memory device 104), cause the one or more processors to select an interrupt level (e.g., the interrupt level 124) that indicates a threshold background operation status (e.g., the threshold background operation status 126) of a set of background operation statuses (e.g., the set of background operation statuses 128). The instructions further cause the one or more processors to write the selected interrupt level to a register (e.g., the background operation control register 172) at the flash memory device to indicate, to the flash memory device, which of the set of background operation statuses are permissible sources (e.g., the permissible source(s) 132) of an interrupt (e.g., the interrupt 150) from the flash memory device to the host device.

Particular aspects of the disclosure are described below in sets of interrelated Examples:

According to Example 1, a device includes a flash interface configured to be coupled to a flash memory device; and a host controller configured to select an interrupt level that indicates a threshold background operation status of a set of background operation statuses; and write the selected interrupt level to a register at the flash memory device to indicate, to the flash memory device, which of the set of background operation statuses are permissible sources of an interrupt from the flash memory device to the host controller.

Example 2 includes the device of Example 1, wherein the host controller is configured to select the interrupt level based on a power level of the device.

Example 3 includes the device of Example 1 or Example 2, wherein the set of background operation statuses includes: not required; required, not critical; required, performance impacted; and critical.

Example 4 includes the device of any of Examples 1 to 3, wherein the host controller is configured to transition to a low-power mode after writing the selected interrupt level to the register at the flash memory device.

Example 5 includes the device of any of Examples 1 to 4, wherein the host controller is configured to reset the interrupt level based on a power level change of the device.

Example 6 includes the device of any of Examples 1 to 5, wherein the host controller is configured to, based on a power level change to a power level above a threshold, service one or more background operations stored at a background operation wait queue of the flash memory device.

Example 7 includes the device of any of Examples 1 to 6, wherein the host controller is configured to receive an interrupt corresponding to one or more exception events and, based on a power level of the device being below an exception event power threshold, add an indicator of the one or more exception events to a wait queue for later processing.

Example 8 includes the device of any of Examples 1 to 7, wherein the flash memory device is configured to detect a background operation exception event and, based on a comparison of a background operation status to the interrupt level in the register, select whether to send an interrupt to the host controller.

Example 9 includes the device of Example 8, wherein the flash memory device includes a background operation wait queue and is configured to add an indicator of the background operation exception event to the background operation wait queue based on the comparison indicating that the background operation status is not a permissible source of an interrupt.

Example 10 includes the device of any of Examples 1 to 9, wherein the flash memory device is configured to receive a host command while performing a background operation; suspend the background operation and service the host command based on a determination that a background operation termination latency will expire prior to completion of the background operation; and resume the background operation after the host command has been serviced.

According to Example 11, a method includes selecting, at a host device that is coupled to a flash memory device, an interrupt level that indicates a threshold background operation status of a set of background operation statuses; and writing the selected interrupt level to a register at the flash memory device to indicate, to the flash memory device, which of the set of background operation statuses are permissible sources of an interrupt from the flash memory device to the host device.

Example 12 includes the method of Example 11, wherein the interrupt level is selected based on a power level of the host device.

Example 13 includes the method of Example 11 or Example 12, wherein the set of background operation statuses includes: not required; required, not critical; required, performance impacted; and critical.

Example 14 includes the method of any of Examples 11 to 13 and further includes transitioning to a low-power mode after writing the selected interrupt level to the register at the flash memory device.

Example 15 includes the method of any of Examples 11 to 14 and further includes resetting the interrupt level based on a power level change of the host device.

Example 16 includes the method of any of Examples 11 to 15 and further includes, based on a power level change to a power level above a threshold, servicing one or more background operations stored at a background operation wait queue of the flash memory device.

Example 17 includes the method of any of Examples 11 to 16, and further includes receiving an interrupt corresponding to one or more exception events; and based on a power level of the host device being below an exception event power threshold, adding an indicator of the one or more exception events to a wait queue of the host device for later processing.

Example 18 includes the method of any of Examples 11 to 17 and further includes detecting, at the flash memory device, a background operation exception event and, based on a comparison of a background operation status to the interrupt level in the register, selecting whether to send an interrupt to the host device.

Example 19 includes the method of Example 18 and further includes, at the flash memory device, adding an indicator of the background operation exception event to a background operation wait queue based on the comparison indicating that the background operation status is not a permissible source of an interrupt.

Example 20 includes the method of any of Examples 11 to 19 and further includes, at the flash memory device: receiving a host command while performing a background operation; suspending the background operation and servicing the host command based on a determination that a background operation termination latency will expire prior to completion of the background operation; and resuming the background operation after the host command has been serviced.

According to Example 21, a non-transitory computer-readable medium stores instructions that, when executed by one or more processors of a host device coupled to a flash memory device, cause the one or more processors to select an interrupt level that indicates a threshold background operation status of a set of background operation statuses; and write the selected interrupt level to a register at the flash memory device to indicate, to the flash memory device, which of the set of background operation statuses are permissible sources of an interrupt from the flash memory device to the host device.

Example 22 includes the non-transitory computer-readable medium of Example 21, wherein the instructions, when executed, further cause the one or more processors to select the interrupt level based on a power level of the host device.

Example 23 includes the non-transitory computer-readable medium of Example 21 or Example 22, wherein the set of background operation statuses includes: not required; required, not critical; required, performance impacted; and critical.

Example 24 includes the non-transitory computer-readable medium of any of Examples 21 to 23, wherein the instructions, when executed, further cause the one or more processors to transition to a low-power mode after writing the selected interrupt level to the register at the flash memory device.

Example 25 includes the non-transitory computer-readable medium of any of Examples 21 to 24, wherein the instructions, when executed, further cause the one or more processors to reset the interrupt level based on a power level change of the host device.

Example 26 includes the non-transitory computer-readable medium of any of Examples 21 to 25, wherein the instructions, when executed, further cause the one or more processors to, based on a power level change to a power level above a threshold, service one or more background operations stored at a background operation wait queue of the flash memory device.

Example 27 includes the non-transitory computer-readable medium of Example 21, wherein the instructions, when executed, further cause the one or more processors to receive an interrupt corresponding to one or more exception events and, based on a power level of the device being below an exception event power threshold, add an indicator of the one or more exception events to a wait queue for later processing.

According to Example 28, an apparatus includes means for selecting an interrupt level that indicates a threshold background operation status of a set of background operation statuses; and means for writing the selected interrupt level to a register at a flash memory device to indicate, to the flash memory device, which of the set of background operation statuses are permissible sources of an interrupt from the flash memory device to a host device.

Example 29 includes the apparatus of Example 28, and further includes means for selecting the interrupt level based on a power level of the host device.

Example 30 includes the apparatus of Example 28 or Example 29, wherein the set of background operation statuses includes: not required; required, not critical; required, performance impacted; and critical.

Example 31 includes the apparatus of any of Examples 28 to 30 and further includes means for transitioning to a low-power mode after writing the selected interrupt level to the register at the flash memory device.

Example 32 includes the apparatus of any of Examples 28 to 31 and further includes means for resetting the interrupt level based on a power level change of the host device.

Example 33 includes the apparatus of any of Examples 28 to 32 and further includes means for servicing, based on a power level change to a power level above a threshold, one or more background operations stored at a background operation wait queue of the flash memory device.

Example 34 includes the apparatus of any of Examples 28 to 33 and further includes: means for receiving an interrupt corresponding to one or more exception events; and means for adding, based on a power level of the host device being below an exception event power threshold, an indicator of the one or more exception events to a wait queue for later processing.

According to Example 35, a device includes a host interface configured to be coupled to a host device; a flash memory; and a controller coupled to the host interface and the flash memory, the controller configured to detect a background operation exception event; and based on a comparison of a background operation status to an interrupt level stored in a register, select whether to send an interrupt to the host device.

Example 36 includes the device of Example 35, wherein the controller is further configured to receive the interrupt level from the host device.

Example 37 includes the device of Example 35 or Example 36, wherein the interrupt level indicates a threshold background operation status of a set of background operation statuses.

Example 38 includes the device of Example 37, wherein the set of background operation statuses includes: not required; required, not critical; required, performance impacted; and critical.

Example 39 includes the device of Example 37 or Example 38, wherein the interrupt level indicates which of the set of background operation statuses are permissible sources of an interrupt from the device to the host device.

Example 40 includes the device of any of Examples 35 to 39 and further includes a background operation wait queue, and wherein the controller is configured to add an indicator of the background operation exception event to the background operation wait queue based on the comparison indicating that the background operation status is not a permissible source of an interrupt.

Example 41 includes the device of any of Examples 35 to 40, wherein the controller is configured to receive a host command while performing a background operation; suspend the background operation and service the host command based on a determination that a background operation termination latency will expire prior to completion of the background operation; and resume the background operation after the host command has been serviced.

According to Example 42, a method includes detecting, at a flash memory device that is coupled to a host device, a background operation exception event; and selecting, at the flash memory device and based on a comparison of a background operation status to an interrupt level stored in a register, whether to send an interrupt to the host device.

Example 43 includes the method of Example 42, and further includes receiving the interrupt level from the host device.

Example 44 includes the method of Example 42 or Example 43, wherein the interrupt level indicates a threshold background operation status of a set of background operation statuses.

Example 45 includes the method of Example 44, wherein the set of background operation statuses includes: not required; required, not critical; required, performance impacted; and critical.

Example 46 includes the method of Example 44 or Example 45, wherein the interrupt level indicates which of the set of background operation statuses are permissible sources of an interrupt from the flash memory device to the host device.

Example 47 includes the method of any of Examples 42 to 46 and further includes adding an indicator of the background operation exception event to a background operation wait queue based on the comparison indicating that the background operation status is not a permissible source of an interrupt.

Example 48 includes the method of any of Examples 42 to 47, and further includes receiving a host command while performing a background operation; suspending the background operation and servicing the host command based on a determination that a background operation termination latency will expire prior to completion of the background operation; and resuming the background operation after the host command has been serviced.

According to Example 49, a non-transitory computer-readable medium stores instructions that, when executed by one or more processors of a flash memory device coupled to a host device, cause the one or more processors to detect a background operation exception event; and select, based on a comparison of a background operation status to an interrupt level stored in a register, whether to send an interrupt to the host device.

Example 50 includes the non-transitory computer-readable medium of Example 49, wherein the instructions, when executed, further cause the one or more processors to receive the interrupt level from the host device.

Example 51 includes the non-transitory computer-readable medium of Example 49 or Example 50, wherein the interrupt level indicates a threshold background operation status of a set of background operation statuses.

Example 52 includes the non-transitory computer-readable medium of Example 51, wherein the set of background operation statuses includes: not required; required, not critical; required, performance impacted; and critical.

Example 53 includes the non-transitory computer-readable medium of Example 51 or Example 52, wherein the interrupt level indicates which of the set of background operation statuses are permissible sources of an interrupt from the flash memory device to the host device.

Example 54 includes the non-transitory computer-readable medium of any of Examples 49 to 53, wherein the instructions, when executed, further cause the one or more processors to add an indicator of the background operation exception event to a background operation wait queue based on the comparison indicating that the background operation status is not a permissible source of an interrupt.

Example 55 includes the non-transitory computer-readable medium of any of Examples 49 to 54, wherein the instructions, when executed, further cause the one or more processors to receive a host command while performing a background operation; suspend the background operation and servicing the host command based on a determination that a background operation termination latency will expire prior to completion of the background operation; and resume the background operation after the host command has been serviced.

According to Example 56, an apparatus includes means for detecting a background operation exception event; and means for selecting, based on a comparison of a background operation status to an interrupt level stored in a register, whether to send an interrupt to a host device.

Example 57 includes the apparatus of Example 56, and further includes means for receiving the interrupt level from the host device.

Example 58 includes the apparatus of Example 56 or Example 57, wherein the interrupt level indicates a threshold background operation status of a set of background operation statuses.

Example 59 includes the apparatus of Example 58, wherein the set of background operation statuses includes: not required; required, not critical; required, performance impacted; and critical.

Example 60 includes the apparatus of Example 58 or Example 59, wherein the interrupt level indicates which of the set of background operation statuses are permissible sources of an interrupt to the host device.

Example 61 includes the apparatus of any of Examples 56 to 60 and further includes means for adding an indicator of the background operation exception event to a background operation wait queue based on the comparison indicating that the background operation status is not a permissible source of an interrupt.

Example 62 includes the apparatus of any of Examples 56 to 61, and further includes means for receiving a host command while performing a background operation; means for suspending the background operation and servicing the host command based on a determination that a background operation termination latency will expire prior to completion of the background operation; and means for resuming the background operation after the host command has been serviced.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
   a flash interface configured to be coupled to a flash memory device; and
   a host controller configured to:
      select an interrupt level that indicates a threshold background operation status of a set of background operation statuses;
      write the selected interrupt level to a register at the flash memory device to indicate, to the flash memory device, which of the set of background operation statuses are permissible sources of an interrupt from the flash memory device to the host controller; and
      transition the device to a low-power mode of operation based on having written the selected interrupt level to the register at the flash memory device.

2. The device of claim 1, wherein the host controller is configured to select the interrupt level based on a power level of the device.

3. The device of claim 1, wherein the set of background operation statuses includes: not required; required, not critical; required, performance impacted; and
   critical, and wherein the host controller is configured to exit the low-power mode of operation based on receipt of a permissible interrupt from the flash memory device.

4. The device of claim 1, wherein the host controller is configured to transition to a low-power mode after writing the selected interrupt level to the register at the flash memory device.

5. The device of claim 1, wherein the host controller is configured to reset the interrupt level based on a power level change of the device.

6. The device of claim 1, wherein the host controller is configured to, based on a power level change to a power level above a threshold, service one or more background operations stored at a background operation wait queue of the flash memory device.

7. The device of claim 1, wherein the host controller is configured to receive an interrupt corresponding to one or more exception events and, based on a power level of the device being below an exception event power threshold, add an indicator of the one or more exception events to a wait queue for later processing.

8. The device of claim 1, wherein the flash memory device is configured to detect a background operation exception event and, based on a comparison of a background operation status to the interrupt level in the register, select whether to send an interrupt to the host controller.

9. The device of claim 8, wherein the flash memory device includes a background operation wait queue and is configured to add an indicator of the background operation exception event to the background operation wait queue based on the comparison indicating that the background operation status is not a permissible source of an interrupt.

10. The device of claim 1, wherein the flash memory device is configured to:
   receive a host command while performing a background operation;
   suspend the background operation and service the host command based on a determination that a background operation termination latency will expire prior to completion of the background operation; and resume the background operation after the host command has been serviced.

11. The device of claim 1, wherein the host controller is configured to send, to the flash memory device, an instruction to cause the flash memory device to transition to a power management mode, the instruction sent based on detection, by the host controller, that a power level associated with the device fails to satisfy a threshold value.

12. A method comprising:
selecting, at a host device that is coupled to a flash memory device, an interrupt level that indicates a threshold background operation status of a set of background operation statuses;
writing the selected interrupt level to a register at the flash memory device to indicate, to the flash memory device, which of the set of background operation statuses are permissible sources of an interrupt from the flash memory device to the host device; and
transitioning, by the host device, to a low-power mode of operation based on having written the selected interrupt level to the register at the flash memory device.

13. The method of claim 12, further comprising sending, to the flash memory device, an instruction to cause the flash memory device to transition to a power management mode, the instruction sent based on detection, by the host device, that a power level associated with the host device fails to satisfy a threshold value, wherein the interrupt level is selected based on the power level of the host device and written to the register at the flash memory device after the instruction is sent to the flash memory device.

14. The method of claim 12, further comprising exiting, by the host device, from the low-power mode of operation based on receiving a permissible interrupt from the flash memory device, wherein the set of background operation statuses includes: not required; required, not critical; required, performance impacted; and critical.

15. The method of claim 12, further comprising resetting the interrupt level based on a power level change of the host device.

16. The method of claim 12, further comprising, based on a power level change to a power level above a threshold, servicing one or more background operations stored at a background operation wait queue of the flash memory device.

17. The method of claim 12, further comprising:
receiving an interrupt corresponding to one or more exception events; and
based on a power level of the host device being below an exception event power threshold, adding an indicator of the one or more exception events to a wait queue of the host device for later processing.

18. A non-transitory computer-readable medium storing instructions that, when executed by one or more processors of a host device coupled to a flash memory device, cause the one or more processors to:
select an interrupt level that indicates a threshold background operation status of a set of background operation statuses;
write the selected interrupt level to a register at the flash memory device to indicate, to the flash memory device, which of the set of background operation statuses are permissible sources of an interrupt from the flash memory device to the host device; and
transition to a low-power mode of operation based on having written the selected interrupt level to the register at the flash memory device.

19. The non-transitory computer-readable medium of claim 18, wherein the instructions, when executed, further cause the one or more processors to:
send, to the flash memory device, an instruction to cause the flash memory device to transition to a power management mode, the instruction sent based on detection, by the host device, that a power level associated with the host device fails to satisfy a threshold value; and
select the interrupt level based on the power level of the host device, wherein the selected interrupt level is written to the register at the flash memory device after the instruction is sent to the flash memory device.

20. The non-transitory computer-readable medium of claim 18, wherein the instructions, when executed, further cause the one or more processors to:
exit the low-power mode of operation based on receipt of a permissible interrupt from the flash memory device; and
based on a power level change to a power level above a threshold, service one or more background operations stored at a background operation wait queue of the flash memory device.

* * * * *